Sept. 12, 1950 A. E. JONES 2,521,852
FISH LURE ACTIVATOR
Filed Aug. 18, 1947

Aron E. Jones
INVENTOR.

BY

Patented Sept. 12, 1950

2,521,852

UNITED STATES PATENT OFFICE 2,521,852

FISH LURE ACTIVATOR

Aron E. Jones, Hoquiam, Wash.

Application August 18, 1947, Serial No. 769,096

7 Claims. (Cl. 43—26.2)

This invention relates to trolling for fish and has special reference to means for spasmodically jerking the trolling line on which the lure is secured.

The objects of my invention are, first, to provide such a jerking means which will cause the lure to act in a manner similar to that of a small fish darting in one direction and then in another direction, thereby attracting the attention of the larger fish; second, to provide such a device as will act automatically and continuously so long as there is relative motion between it and the water; third, to provide such a device, interposed in the line between the trolling boat and the lure, which will be submerged and will alternately tighten and slacken the line between it and the lure; and fourth, to provide a device of great simplicity which will be economical to manufacture, fully automatic in action and of lasting quality.

I attain these and other objects as will be readily perceived by those familiar with the art, by the devices, mechanisms and arrangements illustrated in the accompanying drawings, in which—

Figure 2:
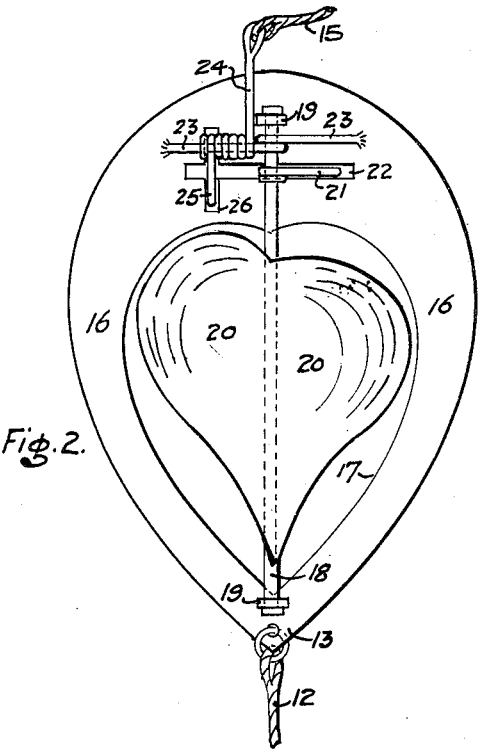
Figure 3:
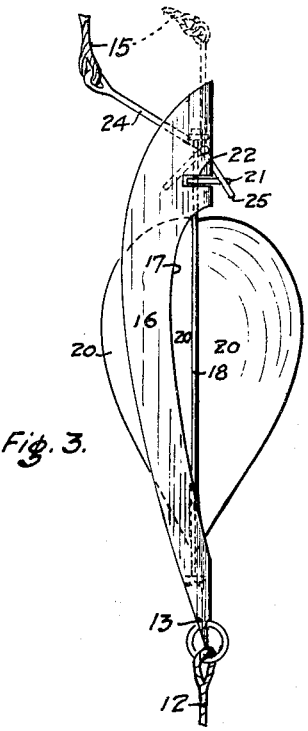
Figure 4:
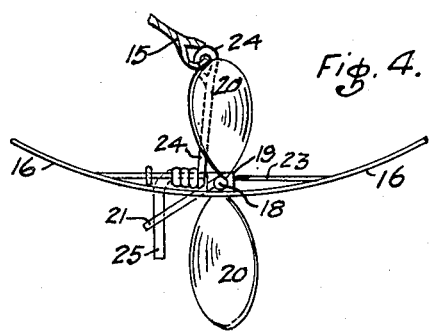
Figure 1:
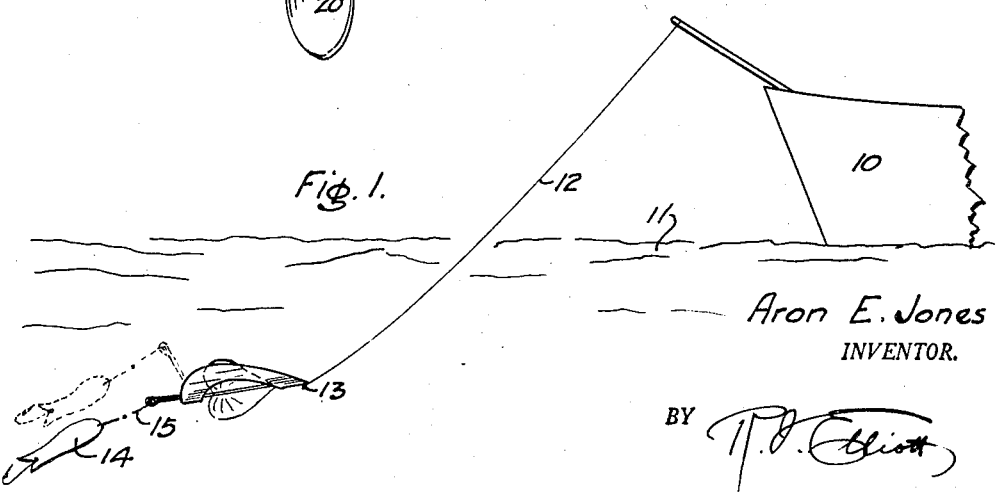

Fig. 1 is a general view illustrating the use of my fish lure activator; Fig. 2 is a plan view of the activator; Fig. 3 is a side view thereof; and Fig. 4 is a front view thereof. Similar numerals of reference refer to similar parts throughout the several views.

In trolling for fish it is customary to provide a suitable lure to which hooks are attached, said lure being intended to appear as a small fish which may be erratic in its movements. This has usually been done by shaping the lure and by causing it to flash reflected light. However, the best form of lure will not be as spasmodic in its movements as such a small fish striving to escape from its larger foe will be, and I have therefore invented the following described activator which puts "life" in the movements of the lure.

Referring, now, to the drawing, the boat 10 is in motion in the water 11 and has a trolling line 12 dragging behind it. The line 12 is secured to to front end 13 of the activator. The fish lure 14 is attached to the end of a line 15 secured, as hereinafter described, to the rear end of said activator.

The activator comprises a plate 16 which may preferably be curved, as shown in Figs. 3 and 4, and which is pear-shaped as viewed in plan. The plate 16 has a large opening 17 therein. A shaft 18 is suitably mounted in bearings 19 at the front and rear ends of the plate 16 and extends centrally substantially from end to end of the said plate. A plate 20 is secured to the shaft 18 along its central line. This plate 20 is of general heart shape and has one edge bent upward while the other edge is correspondingly bent downward, thus forming an elongated screw propeller or fan which may rotate freely in the opening 17. A crank lever 21 is secured to the rear part of the shaft 18, extending therefrom at right angles thereto and passing through a cross slot 22, made in the plate 16, so that said lever 21 will revolve around the axis of said shaft 18, as the shaft rotates.

A cross shaft 23 extends at right angles to the shaft 18 and may be composed of a wire coiled around the shaft 18 and secured at its ends to the plate 16. The activator lever 24 is loosely mounted on this cross shaft 23 and is adapted to oscillate thereon. The activator lever 24 may be composed of a wire coiled around the shaft 23 and having one end 25 extending at right angles to the shaft 23 and lying in the path of the lever 21 as it passes, so that the lever 21 will cause the activator lever 24 to oscillate on the axis of the shaft 23. This end 25 passes downward through the slot 26 in the plate 16. The other end of the activator lever extends at right angles to the shaft 23 and forms the means for giving the lure its desired spasmodic motion, the lure line 15 being secured to the end of this activator lever.

Since the levers 21 and 25 rotate in planes at right-angles to each other, and the plane of the lever 25 is to one side of the crank lever 21, the said crank lever 21 will engage the said lever 25 for only a short part of its travel, thus causing the action of the activator lever 25 to be sudden and brief and permitting the parts to return to inactive positions during a longer period.

Thus it will be seen that, as the boat 10 is rowed or propelled forward, the propeller 20 will rotate but the plate 16, on account of its dihedral angle, will remain horizontal. The drag of the lure 14 and the lure line 15 will pull the activator lever 24 down to lie flat on the plate 16, and in that position, the other end 25 of the wire 24 extends upward above the plate 16. But, as soon as the propeller 20 brings the crank lever 21 into contact with the end 25, it forces it quickly down through the slot 26, thus raising the lever 24 upward with a jerk and causing the lure 14 to dart until the lever 21 is disengaged from the end 25 when the parts return to their first positions and the lure line 15 is slackened and the lure momentarily remains at rest or in slow motion.

It is, of course, understood that variations may be made in the details of my invention, without departing from the spirit thereof, as outlined in the appended claims.

Having described my invention, what I claim and desire to secure by Letters Patent, is:

1. The combination with a lure and a trolling line, of a lure activator interposed in said line in front of said lure and comprising a plate adapted to be drawn through the water by said line, an oscillating lever mounted on said plate, and means carried by said plate to intermittently actuate said lever to alternately tighten and slacken the portion of said line between said activator and said lure.

2. In a device as set forth in claim 1, wherein said means to actuate said lever comprises a fan-bladed propeller mounted on said plate and rotated by the motion thereof through the water; and means operated by said propeller and intermittently engaging the lever to oscillate said lever.

3. In a device as set forth in claim 2, wherein said means operated by the propeller comprises a second lever attached to and rotating with said propeller and adapted to intermittently engage the first lever to actuate said first lever.

4. A device as set forth in claim 7, wherein said means comprises a rotating propeller; a crank secured thereto and adapted to engage, during a portion of its rotation, a part of said activator lever to turn said lever on its pivot and thereby to pull said second line and adapted to free the activator lever during the remainder of its rotation to slacken said line.

5. In a device as set forth in claim 1, wherein said plate is curved transversely.

6. In trolling fishing, the combination of a lure; an activator plate; a trolling line connected to the plate and adapted to draw said plate through the water; a rotating propeller mounted on said plate and actuated by the water; a crank lever attached to said propeller; an activator lever pivoted to said plate and intermittently actuated by said crank lever; and a lure line secured to said activator lever and to said lure to actuate said lure.

7. In trolling fishing, a trolling line; an activator device secured to said trolling line; an activator lever pivotally mounted on said activator device; a lure; a second line joining said activator lever to said lure; and means mounted on said activator device and engaging the activator lever to operate said lever to alternately pull and slacken said second line.

ARON E. JONES.

REFERENCES CITED

The following references are of record in the file of this patent:

UNITED STATES PATENTS

| Number | Name | Date |
| --- | --- | --- |
| 155,266 | Sprague | Sept. 22, 1874 |
| 202,962 | Robertson et al. | Apr. 30, 1878 |
| 545,958 | Hoffman | Sept. 10, 1895 |
| 966,068 | Williamson | Aug. 2, 1910 |
| 1,250,053 | Tukey | Dec. 11, 1917 |
| 1,627,512 | Hughes et al. | May 3, 1927 |
| 1,694,195 | Watts | Dec. 4, 1928 |
| 1,928,418 | Garland | Sept. 26, 1933 |
| 2,065,854 | Edel et al. | Dec. 29, 1936 |
| 2,184,792 | Clarke | Dec. 26, 1939 |
| 2,236,023 | Turner | Mar. 25, 1941 |

FOREIGN PATENTS

| Number | Country | Date |
| --- | --- | --- |
| 280,117 | Germany | Nov. 5, 1914 |
| 829,511 | France | Apr. 5, 1938 |

OTHER REFERENCES

Science Illustrated Magazine, issue of Feb. 1947, page 55, "Robot Fisherman," published by McGraw-Hill Publishing Co., Broadway at 11th St., Louisville, Ky.